United States Patent [19]

Corley, III

[11] Patent Number: 4,977,805
[45] Date of Patent: Dec. 18, 1990

[54] EDGING APPARATUS

[75] Inventor: Andrew J. Corley, III, Lookout Mountain, Tenn.

[73] Assignee: Corley Manufacturing Company, Chattanooga, Tenn.

[21] Appl. No.: 65,170

[22] Filed: Jun. 16, 1987

Related U.S. Application Data

[63] Continuation-in-part of Ser. No. 850,225, Apr. 10, 1986.

[51] Int. Cl.$^5$ ............................................. B26D 5/04
[52] U.S. Cl. ...................................... 83/76.8; 83/76.9; 83/368; 83/418; 364/474.02; 364/474.09; 144/357
[58] Field of Search .......................... 83/71, 368, 418; 144/357, 3 N, 356, 376, 378; 414/357; 364/474.02, 474.09, 474.13, 474.32, 474.34

[56] References Cited

U.S. PATENT DOCUMENTS

| | | | |
|---|---|---|---|
| 3,856,061 | 12/1974 | Miles | 144/357 |
| 4,196,648 | 4/1980 | Jones et al. | 83/365 |
| 4,205,568 | 6/1980 | Foster | 83/71 |
| 4,207,472 | 6/1980 | Idelsohn et al. | 250/563 |
| 4,239,072 | 12/1980 | Meriläinen | 83/371 |
| 4,281,696 | 8/1981 | Howard et al. | 144/312 |
| 4,383,561 | 5/1983 | Gregoire et al. | 144/357 X |
| 4,386,641 | 6/1983 | Horn | 144/329 |
| 4,413,662 | 11/1983 | Gregoire et al. | 144/356 |
| 4,449,557 | 5/1984 | Makela et al. | 144/357 |
| 4,462,443 | 7/1984 | Allen | 144/242 |
| 4,468,992 | 9/1984 | McGeehee | 83/56 |
| 4,596,172 | 6/1986 | Visser | 83/71 |
| 4,644,832 | 2/1987 | Smith | 364/474.02 |
| 4,700,758 | 10/1987 | Bernath | 144/357 |
| 4,866,630 | 9/1989 | Beaman et al. | 364/474.02 |
| 4,879,659 | 11/1989 | Bowlin et al. | 364/474.09 |
| 4,887,219 | 12/1989 | Strauser | 364/474.09 |

Primary Examiner—Frank T. Yost
Assistant Examiner—Hwei-Siu Payer
Attorney, Agent, or Firm—Luedeka, Hodges & Neely

[57] ABSTRACT

An edging apparatus edges a wood board to achieve a desired rounding effect under a rounding rule of the lumber industry. A positioning apparatus positions and holds two edging saws, and the positions of the saws are initially controlled by an operator who selects initial cut positions. Input data, including board length and thickness parameters and the initial cut positions are generated by input devices and a computer is responsive to the input data for computing the best cut positions of the saws. In making this computation, the computer takes into consideration the rounding rule and, according to predetermined criteria, the computer selects best cut positions that will produce an edged board whose measurement exceeds a whole board foot measurement by a desired fraction of a board foot. Adjustment input may be provided to adjust the size of the desired fraction of the board foot. The computed best cut positions are then transmitted as output from the computer so that the saws may be positioned in accordance therewith. Length trim markers are positioned in front of the saws to mark the trim length of the board before it is edged. Thus, length trim and edging decisions may be made at the same time by the same operator before edging or trimming the board. In one form, the thickness of all boards is assumed to be one inch, as is the custom of the industry.

5 Claims, 11 Drawing Sheets

EDGING APPARATUS

This application is a continuation of application Ser. No. 850,225, filed Apr. 10, 1986.

FIELD OF THE INVENTION

The present invention relates to an edging apparatus and particularly relates to an edging apparatus for hardwood boards that computes best cut positions for the edging saws based on the rounding rule that is used when measuring the wood.

BACKGROUND AND SUMMARY OF INVENTION

An edger is an apparatus that is used to cut lengthwise edges on a wood board and it typically includes a pair of saws to cut the lengthwise edges. Numerous edging devices have been developed that optimize the physical size of the edged board. These prior devices typically seek to edge the board in order to obtain the largest board possible, and the problem with these devices as applied to hardwood is that they ignore the rounding rule used to price hardwood lumber. In accordance with one aspect of the present invention, an edging apparatus is provided that makes edging decisions based on the rounding rule of the hardwood lumber industry in the United States.

The rounding rule basically provides that the measurement of all boards shall be rounded to the nearest whole board foot. For example, a board having a measurement of 4.4 board feet would be rounded to four board feet, and 4.6 board feet would be rounded to five board feet. Hardwood boards are cut to standard lengths and thicknesses, but the width of the board may be cut to any random size. Thus, the width of the board is critical in determining the number of board feet in a particular board (A board foot is the equivalent of a board that is 1" thick, 1' wide and 1' long). In view of the rounding rule, an edger that merely maximizes the size of the board is wasteful in a sense. For example, it would be wasteful to edge a board so that it measured 4.4 board feet. It would be preferred to edge the board so that it measured 3.6 board feet. A board that measures 3.6 board feet will be rounded to four board feet, the same as a board measuring 4.4 board feet, and the value of the two boards is the same. But, when the board is cut to 3.6 board feet, as opposed to 4.4 board feet, a greater volume of valuable wood chips are produced. Also, in edging the board to achieve 3.6 board feet, as opposed to 4.4 board feet, it is less likely that the board will be degraded for leaving too much wane or will require a second edging.

In the United States, the procedure for tallying hardwood is to determine the length and width of a board and determine an assumed number of board feet based on a one inch thickness assumption. The assumed board foot measurement is rounded to the nearest whole board foot, and later such measurement is corrected for thickness. For example, if a board is one-half inch thick, the assumed board foot measure is divided by two, and the result is the actual board foot measurement by which the board is sold.

In actual practice, a tallying stick is used to measure the boards. The tally stick is a ruler with numerous parallel scales; each scale marked in board feet for a particular length board. For example, to measure a fourteen foot board, the person taking the tally places the tally stick across the width of the board, locates the scale for fourteen feet and reads a board foot measurement directly from the scale. The tally stick has already performed the multiplication, in a sense. Later when the tallying is complete for a stack of boards having equal thickness, the measurement for the entire stack is multiplied or divided by a factor to correct for the thickness of the board. From the above discussion, it will be appreciated that, in practice, the industry is rounding the board area measurement and then multiplying by board thickness, even though the tally stick is scaled by board feet, a measurement of volume. As used herein the concept and terminology of "rounding a board foot" measurement is broadly construed and includes the rounding system used by the United States hardwood industry.

The present invention provides an ability to edge a board so as to achieve a desired effect taking into consideration the rounding rule.

In accordance with one form of the present invention, an edging apparatus includes saws for edging a board and a positioner for positioning and holding the saws. A selector is used by an operator to select initial cut positions by the saws and input apparatus generates input data corresponding to board length and initial cut positions. In the preferred embodiment, the input apparatus includes sensor means or feedback means connected to the positioner for directly generating data relating to initial cut positions, and a keyboard is provided on which the operator inputs the length of the board. A computer is responsive to the input data for at least multiplying the board length by a width factor corresponding to the initial cut positions to produce a computed signal. The computed signal is produced as an output and the saws are positioned based on the computed signal. It is preferred to mechanically position the saws based on the computed signal, but an operator decision also could be made based on the computed signal, and the saws would be positioned accordingly. In the latter case, information based on the computed signal is shown on a display, and the operator reads the display, makes a decision and manually positions the saws. In accordance with another form of the present invention, an edging apparatus is controlled by an operator and has two saws for edging a wood board that is priced by the whole board width in accordance with the rounding rule under which fractions of a board are rounded up or down. The edging apparatus includes a positioning device for positioning and holding the saws, and through a selection apparatus the operator selects initial cut positions for the saws. Input devices generate input data that includes board length and thickness parameters and the initial cut positions. In one embodiment, a keyboard is used to provide the board length and thickness parameters and a position feedback circuit is used to provide data on the initial cut positions if, however, the apparatus is designed to assume a one inch thickness, the operator need only keypunch length data. In such case the thickness factor of "1" is incorporated in a computer program stored in a memory and such memory may be considered as part of the input device providing input data. A computer is responsive to the input data for computing the best cut positions for the saws based on the rounding rule. The best cut positions are computed to produce an edged board whose measurement exceeds a whole board foot measurement by a desired fraction of a board foot, and an output device is provided for outputting the computed best cut positions so that the saws may be positioned in accordance therewith.

It will be noted that the present invention provides that the best cut positions are determined so that the edged board exceeds a whole board foot measurement by a desired fraction thereof. In many cases, the desired fraction will be slightly more than 0.5, such as 0.6 board feet, so that the board will always be rounded upwardly. However, in other cases, an operator may not wish to take advantage of the rounding rule. In some cases, saw mills have built up a reputation for measurement generosity. That is, customers may buy from a particular saw mill because he feels that the lumber received from that mill is usually rounded down rather than up. In order to maintain this reputation of generous measurements, an operator may prefer to choose the fraction so that it is more than zero but less than 0.5. For example, he may wish to have each board measure 0.2 board feet over a whole board foot and would thus choose the fraction to be 0.2 board feet. In order to achieve flexibility and accommodate different saw mills, one embodiment of the present invention provides an adjustment means that is operable through the computer to adjust the size of the desired fraction of a board foot. In this manner, an operator may make an intelligent decision as to whether his boards should be cut to a size that will cause their measurements to be rounded up or down.

In the above discussion concerning the rounding of board foot measurements, it will be recalled that such rounding occurs in the trade before the measurement is corrected for actual thickness. For example, suppose a $\frac{3}{4}''$ board measured slightly over $8\frac{1}{4}$ board feet on a tally stick. Under industry practice, over $8\frac{1}{2}$ is rounded to 9 and then divided by four to correct for thickness. Thus, the board would contribute $2\frac{1}{4}$ board feet in measurement for the tally of a stack of $\frac{3}{4}''$ boards. The computer in the preferred embodiment uses the $1''$ thickness assumption that is used in the industry, but the present invention could accommodate other rounding rules or changing rounding rules by simply modifying the computer's programming. Except as set forth in the claims, it is not intended to limit the invention to any particular rounding rules.

When the computer is calculating the best cut positions, it must know the board thickness and length or in the case of assumed one inch thickness it must know board length. In the past, the length trim decision was usually made independently of the edging decision and the two decisions were usually made in different places by different people. This system made it difficult or impossible to make truly intelligent edging and trim decisions that took into consideration the rounding rule. The present invention solves this problem by providing a length trim marker that marks the board with trim marks indicating where the boards should be trimmed to achieve a desired board length based on board length input data. The length trim markers are positioned in front of the saws and the board is marked before it is edged. In this manner, the length trim and edging decisions may be made at the same time by the same operator prior to edging or trimming. Alternatively, an automatic spray marker which sprays digits designating length may be used as trim markers. This marker indicates digitally the length to which the board is to be trimmed.

In accordance with another aspect of the present invention, the apparatus further includes judgment means associated with the computer for making a judgment as to whether the best cut positions should be further apart or closer together than the initial cut positions in order to achieve the desired fraction of a board foot when the board is edged. The judgment in many cases will be to always choose a best cut position in which the cut positions are spaced closer together than the initial cut positions. In another embodiment, the best cut positions may be chosen to be those that are nearest the initial cut positions that achieve the desired fraction of a board foot. Also, an override is provided so that the operator may override the decision of the judgment means as to whether the best cut positions should be further apart or closer together than the initial cut positions, and a further manual override control is provided so that the operator may manually set the position of the saws independently of either of the computed best cut positions.

In accordance with yet another aspect of the present invention, a further embodiment provides a preview table for receiving boards and lasers forming laser lines representing saw lines on the preview table. Positioning apparatus and controls are provided for moving the lasers and laser lines on the preview table to position the laser lines on the board in desired initial cut positions, and initial cut position data is generated by feedback circuitry corresponding to the initial cut positions selected by the operator using the lasers. Based on the initial cut position data, and the other input data, the best cut positions are calculated and an output signal is generated that corresponds to the best cut positions. A control mechanism is responsive to the output signal to position the saws in such best cut positions. In this manner, the lasers and the saws operate independently, and because of this independent operation, the lasers may be used to select best cut positions for a new board while the previous board is being edged.

In the apparatus utilizing a preview table and a plurality of lasers associated with the preview table, the length trim selection may also be made at or adjacent to the preview table. In accordance with another aspect of the present invention, a plurality of lasers form a plurality of laser trim lines across the preview table to indicate possible standard lengths to which the board may be trimmed, and a plurality of trim markers are aligned with the laser trim lines for selectively marking the boards at positions corresponding to the laser trim lines. In the preferred mode, an infeed table is positioned downstream from the preview table and upstream from the saws. A transfer mechanism transfers the boards from the preview table to the infeed table, and as the boards are transferred, the boards are marked by the trim markers.

BRIEF DESCRIPTION OF THE DRAWINGS

The present invention may best be understood by reference to the following Detailed Description of preferred embodiments when considered in conjunction with the Drawings in which.

DETAILED DESCRIPTION

Figure 1B:
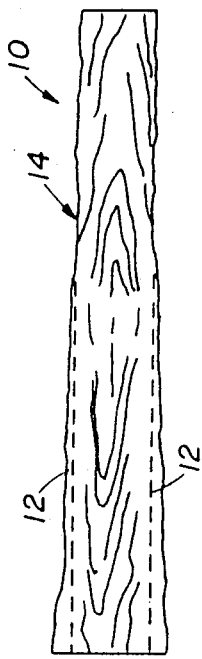
FIGS. 1a and 1b represent two hardwood boards prior to edging.
Figure 1A:
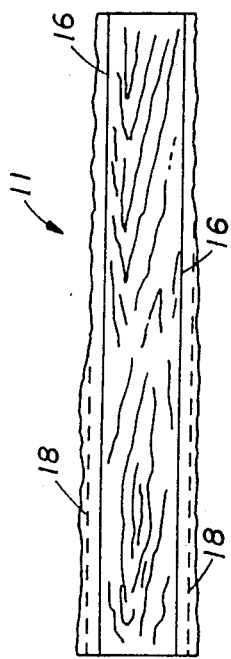

Referring now to the drawings in which like reference characters designate like or corresponding parts throughout the several views, a pair of unedged boards 10 and 11 are shown in FIGS. 1a and 1b that are marked to illustrate the edging of the boards. In FIG. 1a, the board 10 is marked with a dotted line 12 that indicates the lines along which an operator would select to edge the board. In this case, the operator has selected what he considers to be the optimum position for edging the board 10. Under the grading rules for hardwood boards, a certain amount of wane may be left on the board. In this case, wane has been left in the area designated by the character 14 and it covers approximately one-third of the length of the board. If board 10 were to be manually edged, it would be edged along lines 12 and wane would be left in the area 14. If the operator made a poor edging decision and left too much wane, the board will be degraded or it is necessary to re-edge the board.

In FIG. 1b, a second board 11 is shown with the solid edging lines 16 representing one choice for edging the board and the dotted edging lines 18 representing a second choice for edging the board. These two choices were made taking into account the rounding rule that is used for measuring hardwood boards. In measuring hardwood boards, the board is first assumed to have a one inch thickness, and then anything over one-half of a board foot is rounded up, anything below one-half of a board foot is rounded down; and boards whose measurements include exactly one-half of a board foot are rounded up half of the time and down half of the time. After rounding, the measurements are corrected according to the actual thickness of the board. In the example shown in FIG. 1b, the edging choices have been depicted to take advantage of the rounding rule. The edging lines 16 represent interior edging positions and the edging lines 18 represent the exterior edging positions. For example, if the board is edged along line 16, the board will measure slightly greater than 9.5 board feet and will be rounded to ten board feet. If the board is edged along the line 18, it would measure slightly greater than 10.5 board feet and would be rounded to eleven board feet. If the board is edged anywhere between lines 16 and 18, it will be rounded to ten board feet. Thus, to maximize the value of the board 11, it would be preferred to edge the board along line 16. In this manner, the possibility of leaving too much wane and having the board 11 degraded is minimized. In fact, in this example, edging along lines 16 would leave no wane. The portion of the board that is removed during the edging produces valuable wood chips and, thus, the total value obtained from the rough board 11 is increased by edging the board along the interior positions defined by edging lines 16. If the board were edged along the edging lines 18, too much wane would be left and the board would be degraded or would require re-edging.

In the apparatus of the present invention the rounding rule is taken into consideration to achieve a desired effect. As previously mentioned, it may not be desirable in every case to take advantage of the edging rules. In some cases, a saw mill operator may desire to edge his boards so that the edging rules actually take advantage of him in that his boards are cut so that their measurements must be rounded downwardly.

Figure 2:
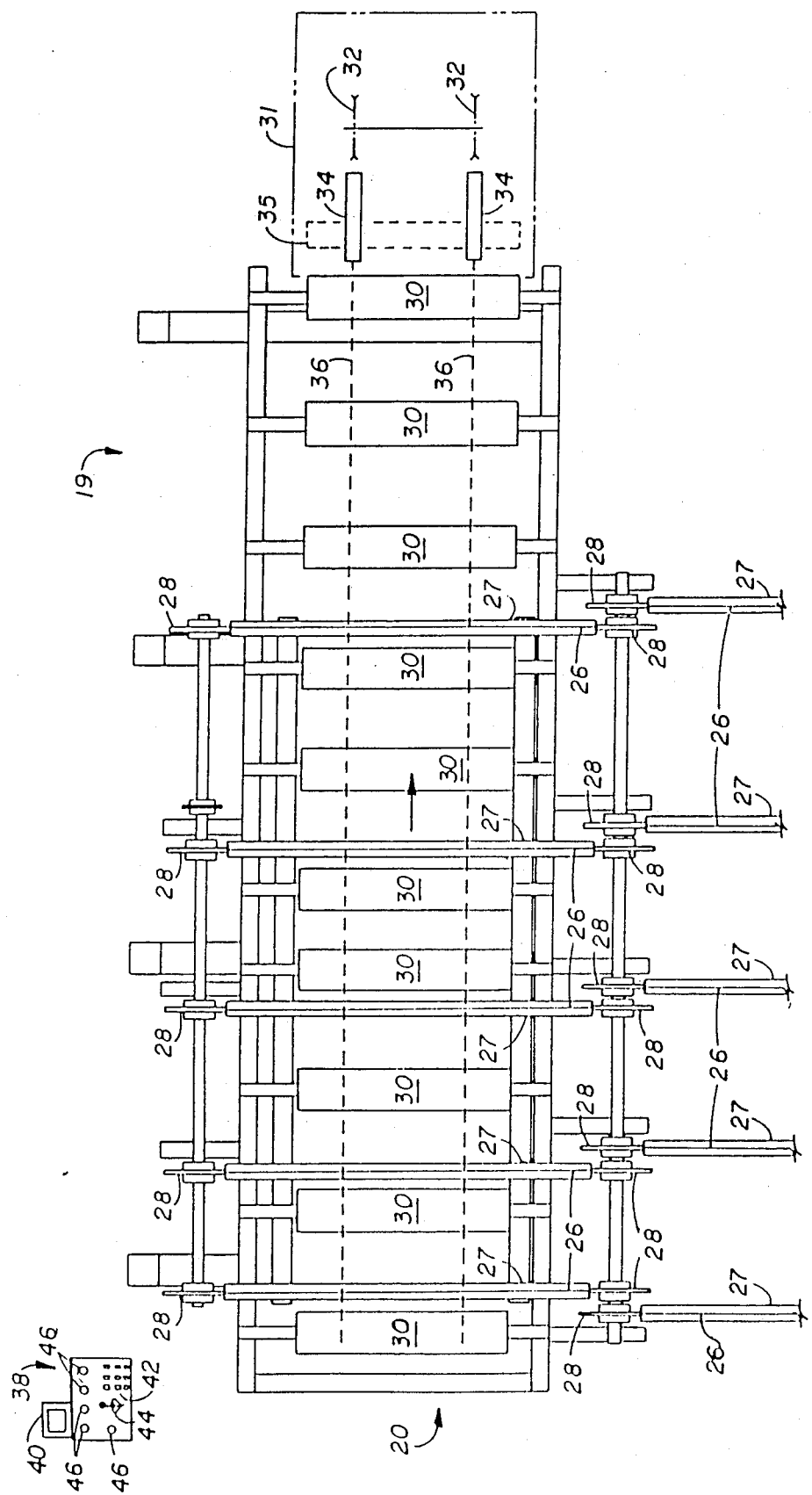
FIG. 2 is a plan view of an edger having an infeed table in front of edging saws.
Figure 3:
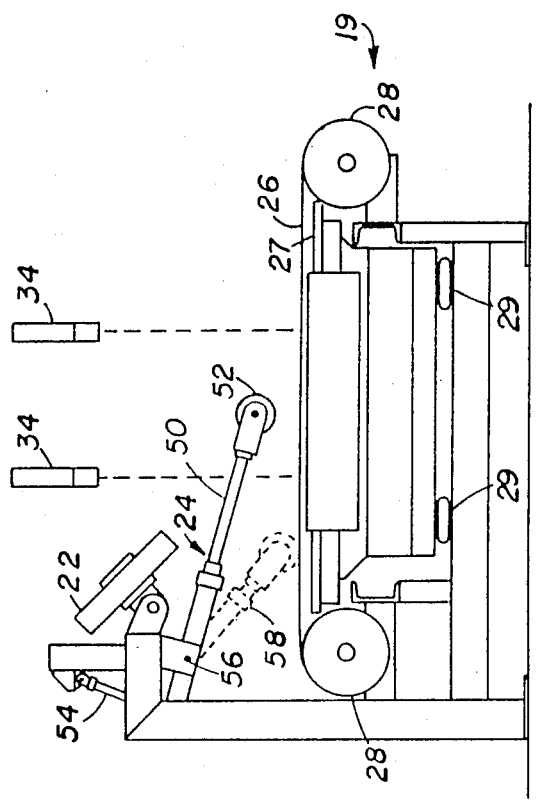
FIG. 3 is an end view of the infeed table also showing a trim marker and lasers that are slaved to the saws.
Figure 4:
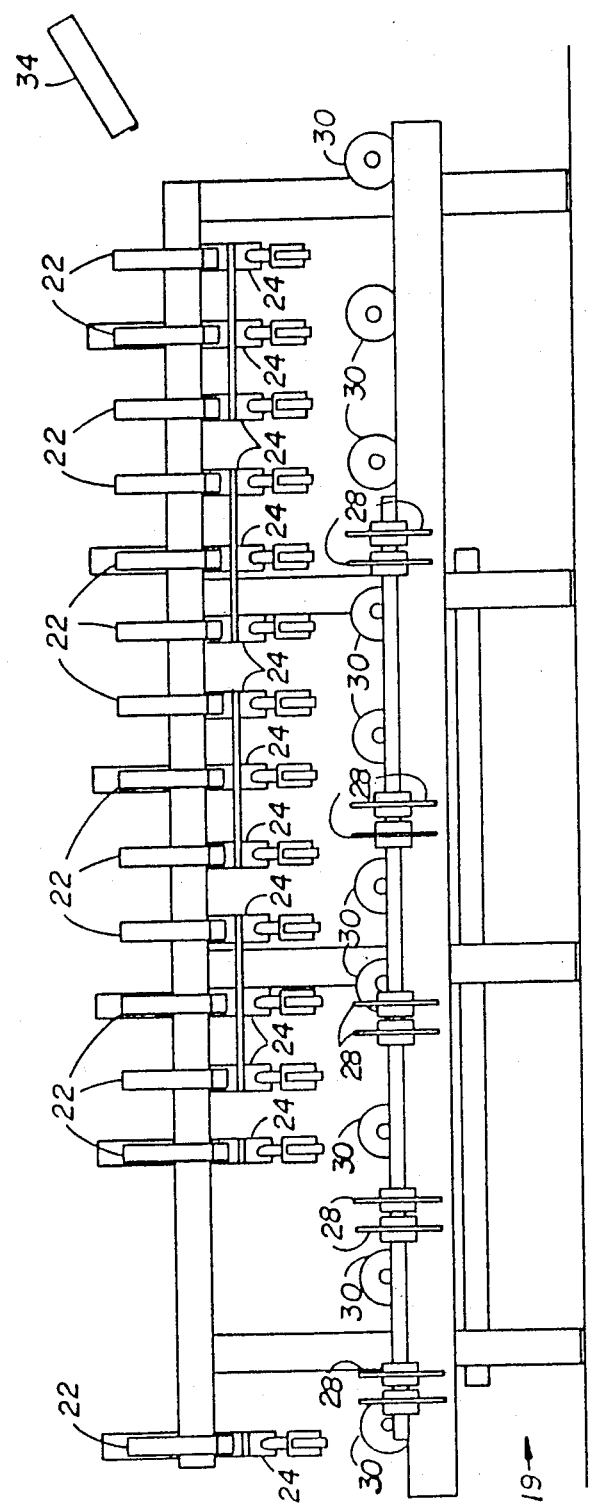
FIG. 4 is a side view of the infeed table and the trim markers.

An edger 19, constituting one embodiment of the present invention, is shown in FIGS. 2, 3 and 4. FIG. 2 is a plan view of an infeed table 20 of the edger 19. FIG. 3 is an end view of the edger 19 showing an array of trim lasers 22 and trim markers 24, and FIG. 4 is a side view of the edger 19 also showing the trim lasers 22 and the trim markers 24. Referring to FIGS. 2, 3 and 4, it will be appreciated that the infeed table 20 is equipped with chains 26 mounted on the drive sprockets 28 that are used to move the wood boards, such as boards 10 and 11, in a transverse direction with respect to the infeed table 20. The boards 10 are generally positioned in an orientation perpendicular to the chains 26 and the chains 26 are raised by chain lifts 27 which are mounted on air bladders 29 and move the boards 10 onto the infeed table 20. Once the board 10 is positioned over the infeed table 20, the chains are lowered and rollers 30 support the board. With the board on the rollers 30, the operator rough sets the board by hand in a proper position on the rollers 30 so that it will be positioned generally perpendicularly to the rollers 30 and the chains 28.

A saw chamber 31 is positioned adjacent to the right side of the infeed table 20, and a pair of edging saws 32 are mounted within the chamber 31. A pair of lasers 34 are slaved to the saws 32 and produce a pair of laser lines 36 projecting down the length of the infeed table 20. The laser lines 36 represent the edging lines or saw lines that will be produced when the board on the infeed table is fed into the saw chamber 31. Feed rollers 35 are also mounted within the chamber 31 for feeding a board toward the saws 32, and a control panel 38 is provided on the left end of the infeed table 20 for controlling the various operations of the edger 19. The control panel 38 is conventional in design and includes a display 40, a key pad 42, a joy stick 44 and lighted push buttons 46. The control panel 38 is interfaced with a computer which will be hereinafter described in greater detail. The joy stick 44 is used to manipulate the position of the saws 32 and the slaved lasers 34, and the push buttons 46 provide specific purpose actuation signals as will hereinafter be described in greater detail.

Referring to FIGS. 3 and 4, there is shown an array of trim lasers 22 that project laser lines across the infeed table 20 in a transverse direction. The lasers 22 are positioned to mark standard board lengths to which a rough board may be trimmed. By observing the laser lines projected from lasers 22, the operator may position a board for trim marking. A plurality of trim markers 24 are aligned with the lasers and are operable to mark boards on the infeed table 20 along the laser lines from lasers 22. An individual trim marker 24 is best shown in FIG. 3. The trim marker 24 includes a telescoping arm 50 that is preferably a piston and cylinder that extends and retracts a marking wheel 52. Once the arm 50 is fully extended, a second piston and cylinder set 54 retracts and causes the arm 50 to pivot about a pivot point 56. In this manner, the marking wheel 52 is forced downwardly. As the arm 50 retracts, the piston and cylinder 54 continues the downward pressure on the marking wheel 52 so that it will run across a board when it is on the infeed table 20. The dotted arm 58 designates the position of the arm 50 after it is fully retracted and after it has marked a board on the infeed table.

Figure 5:
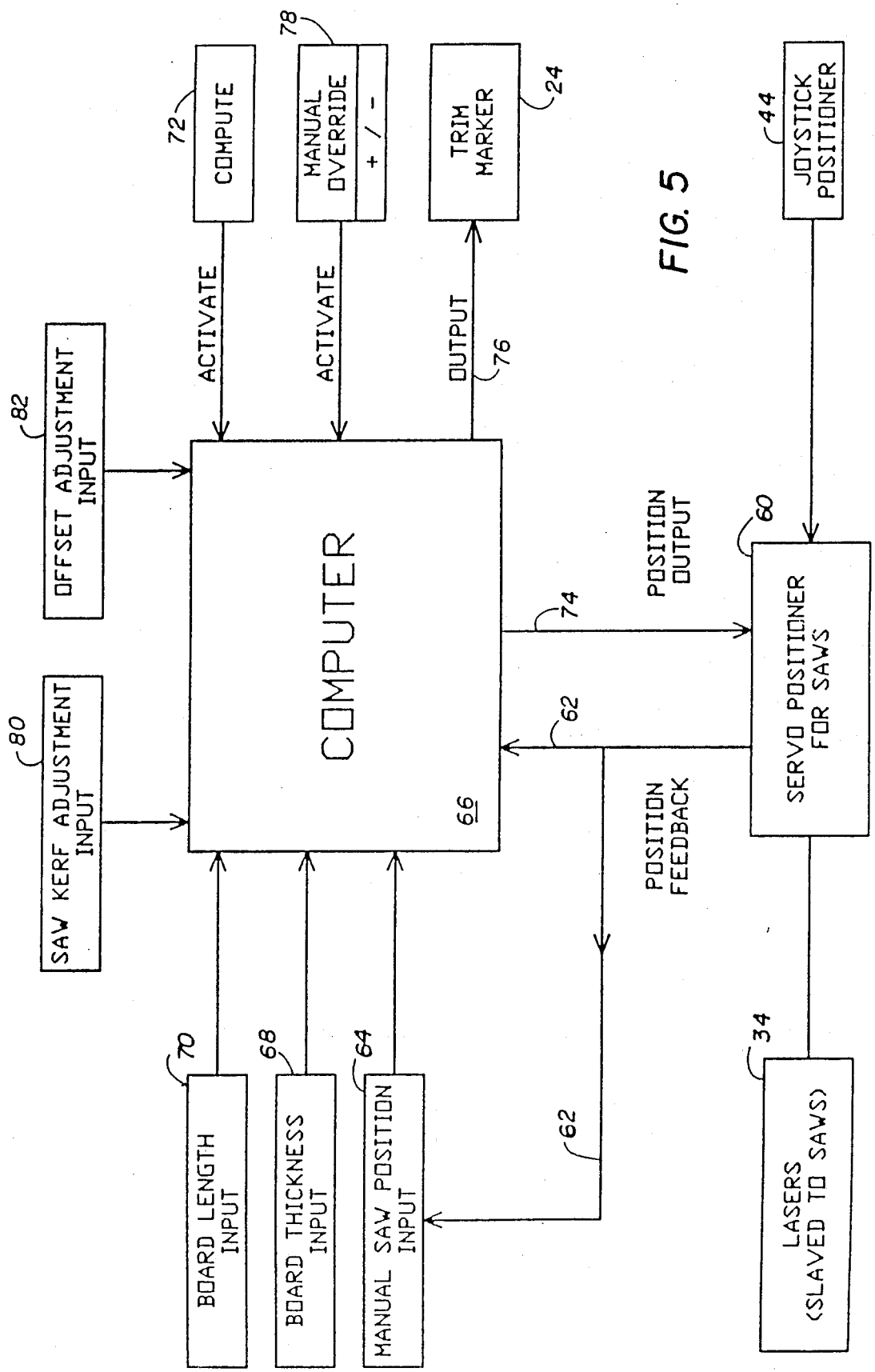
FIG. 5 is an operational block diagram depicting the operation of the edger shown in FIGS. 2, 3 and 4.

An operation block diagram is shown in FIG. 5 that illustrates the function of a computer 66 in controlling the edger 19. The chains 26 are preferably controlled through the special purpose buttons 46 in a conventional fashion. Once the board has been manually positioned on the infeed table, the operator observes the laser lines 36 and using the joy stick 44 moves the saws 32 and the lasers 34 into a desired position which is referred to herein as the initial cut position. The joy stick 44 operates a servo positioner 60 for the saws 32 and the lasers are moved by virtue of the fact that they are mechanically slaved to the saws. A position feedback circuit 62 feeds saw position data to the computer 66 and, thus, the computer 66 constantly monitors the position of the saws 32. After the operator has positioned a board 10 in a desired position on the infeed table 20, the desired board thickness and board length must be input to the computer 66 through inputs 68 and 70. The board thickness input 68 may be a mechanical device that actually physically measures the board as it is resting on the infeed table 20, but it is preferably information that is provided to the computer through the key pad 42 on the control panel 38. Likewise, the board length input 70 is provided through the key pad 42 by the operator. The board thickness input may also be an assumed value of one inch which is incorporated into the computer program of computer 66.

The length to which a particular board 10 will be trimmed is determined by the operator while the board 10 is resting on the infeed table 20. This decision is aided by the array of lasers 22 which show the operator where the board may be trimmed in terms of standard lengths. Once the board length and thickness have been given to the computer 66 and the operator has set the saws 32 to an initial cut position, the compute input 72 is provided to the computer 66. Again, this input may be provided to the computer through a special purpose button 46, or the compute signal may be given through the key pad 42. When the compute input 72 is provided, the computer 66 will calculate the board foot measurement of the board after it is edged. In the preferred mode, the computer will follow the rounding rules that first assume a one inch thickness. Once that measurement has been determined, the computer 66 will then select a best cut position based upon predetermined criteria within the computer. In the preferred and simplest embodiment of the apparatus, the computer will determine the best cut positions that are nearest the initial cut positions, but narrower than the initial cut positions. For example, if the board had a measurement of 9.8 board feet when the saws were placed at the initial cut positions, the computer 66 would select best cut positions that would produce a measurement of slightly greater than 9.5 board feet. In this manner, the board will be edged to provide the smallest possible board that will still be rounded up to ten board feet. After the compute input 72 is given, the computer will produce a position output on line 74 that will actuate the servo positioner 60 to move the saws to the best cut positions. Also, the lasers 34 will move to show the operator the best cut positions selected by the computer 66. If the operator agrees with the selection made by the computer 66, a trim command may be given through the key pad 42 and a trim output will be produced by the computer 66 on line 76 to the trim markers 24. The operator has previously given the computer 66 the selected board length and the appropriate trim markers 24 will be actuated to mark the board accordingly. If the operator is not pleased with the best cut positions selected by the computer, a manual override input 78 may be provided to the computer 66 by the operator through the key pad 42 or through the special purpose buttons 46. Once the manual override input 78 is given, the saws 32 are placed in any position desired by the operator using joy stick 44.

In order for the computer 66 to accurately position the saws 32, the computer 66 must have a saw kerf adjustment input 80 so that the edging decision takes into consideration the width of the saws 32 when they are positioned. The saw kerf adjustment input 80 is provided to the computer 66 through the key pad 42.

An offset adjustment input 82 is also provided to the computer 66. This offset adjustment input 82 determines the fraction of a board foot measurement that the computer 66 will attempt to obtain. For example, if 0.65 board feet were input to the computer 66 as the offset adjustment input 82, the computer 66 would always select best cut positions that will provide a 0.65 fractional board foot. For example, if an initial cut position selected by an operator produced a ten board foot measurement, the computer 66 would select best cut positions that would produce a 9.65 board foot measurement. Alternatively the computer 66 could be programmed to make a judgment to select one of several best cut positions. In one form, it could select the nearest board foot measurement that had a 0.65 fractional board foot measurement. For example, if the initial cut positions produced a board measurement of 10.4, the computer would select best cut positions to produce a board foot measurement of 10.65. If this were not an acceptable position, the computer 66 could be prompted to select the next smaller or more narrow best cut position, and it would select the best cut positions that produced a 9.65 board foot measurement. In another form, the computer 66 selects the wider best cut position if it is within a selected range of the initial cut positions, else it selects the narrower best cut position. The foregoing are intended only as examples of the type of logic that may be programmed into computer 66 to select best cut positions. In each case, the boards are edged in order to produce a desired effect in accordance with the rounding rule that is used in the hardwood lumber industry. In the preferred embodiment, the computer 66 is programmed to assume a one inch thickness and calculate the board feet. Later, the board feet measurement is adjusted according to actual thicknesses. For example, if a group of ½" boards are being edged, the computer 66 will edge them assuming a 1" thickness and as each board is edged the board foot measurements are added together and stored in memory. At the end of a run of ½" boards the total board foot measurement is divided by two and, thus, the board foot measurement is adjusted to reflect actual thickness.

Figure 6:
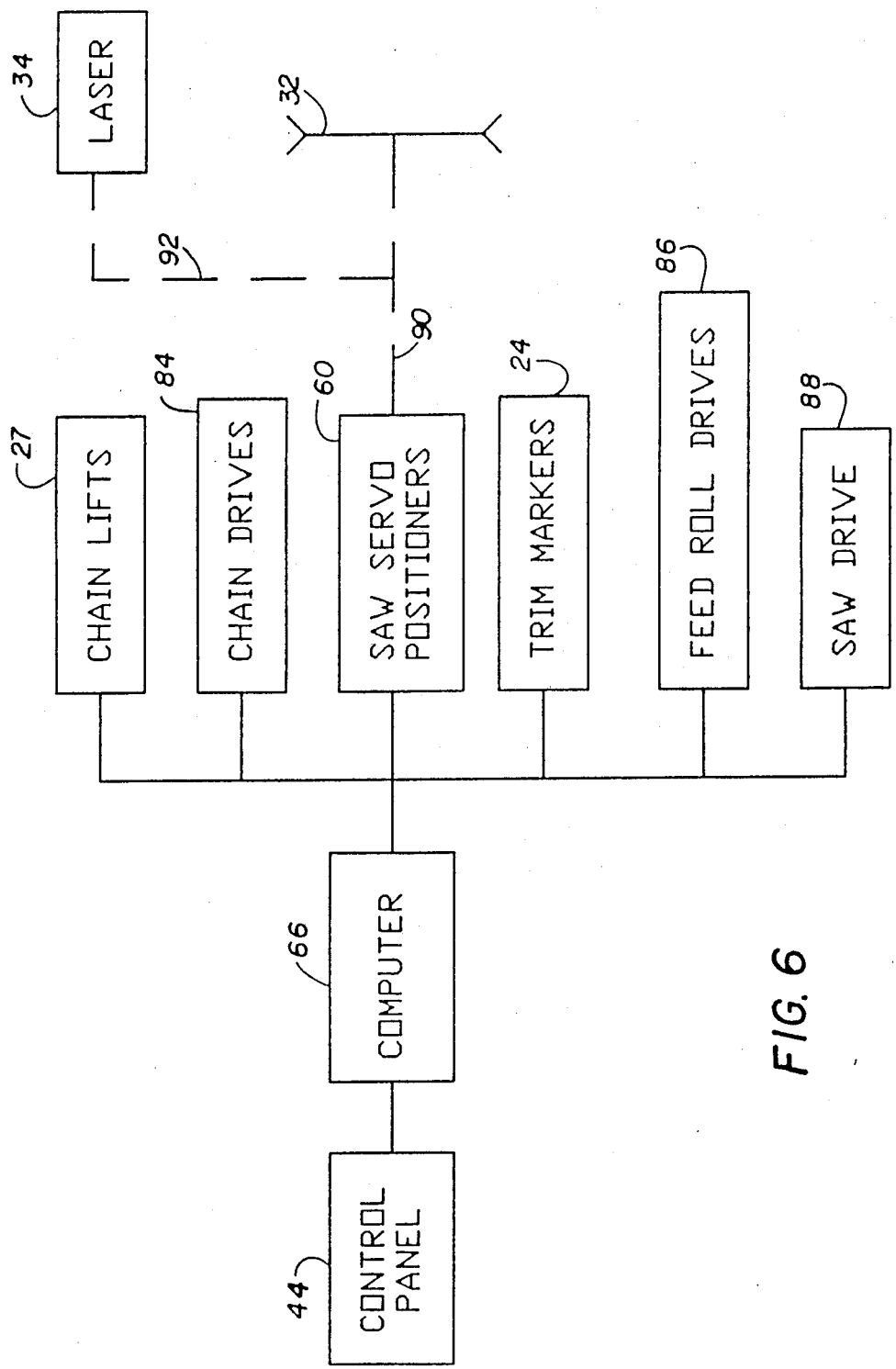
FIG. 6 is a block diagram of the control system for the edger.

A block diagram of the edger 19 is shown in FIG. 6 to illustrate the control interconnections of edger 19.

The control panel 24 is interfaced with the computer 66 which is interfaced with the operating systems of the edger 19 comprising the chain lifts 27, chain drives 84, the saw servo positioner 60, the trim markers 24, the feed roller drives 86, and a saw drive 88. The edger chamber 31 and the internal components are preferably Model E648 edgers produced by Corley Manufacturing Company. The saw servo positioner 60 is preferably a piston and cylinder set with an ultrasonic position transducer built within it such as manufactured by Temposonic. The positioners 60 are connected by a mechanical linkage 90 to the saws for adjusting the saw positions. Also, mechanical linkages 92 are provided between the saws 32 and the lasers 34 so that the lasers 34 move with the saws, and the positioner 60 provides a signal to the computer 66 indicating the position of the saws 32 and lasers 34.

Figure 7:
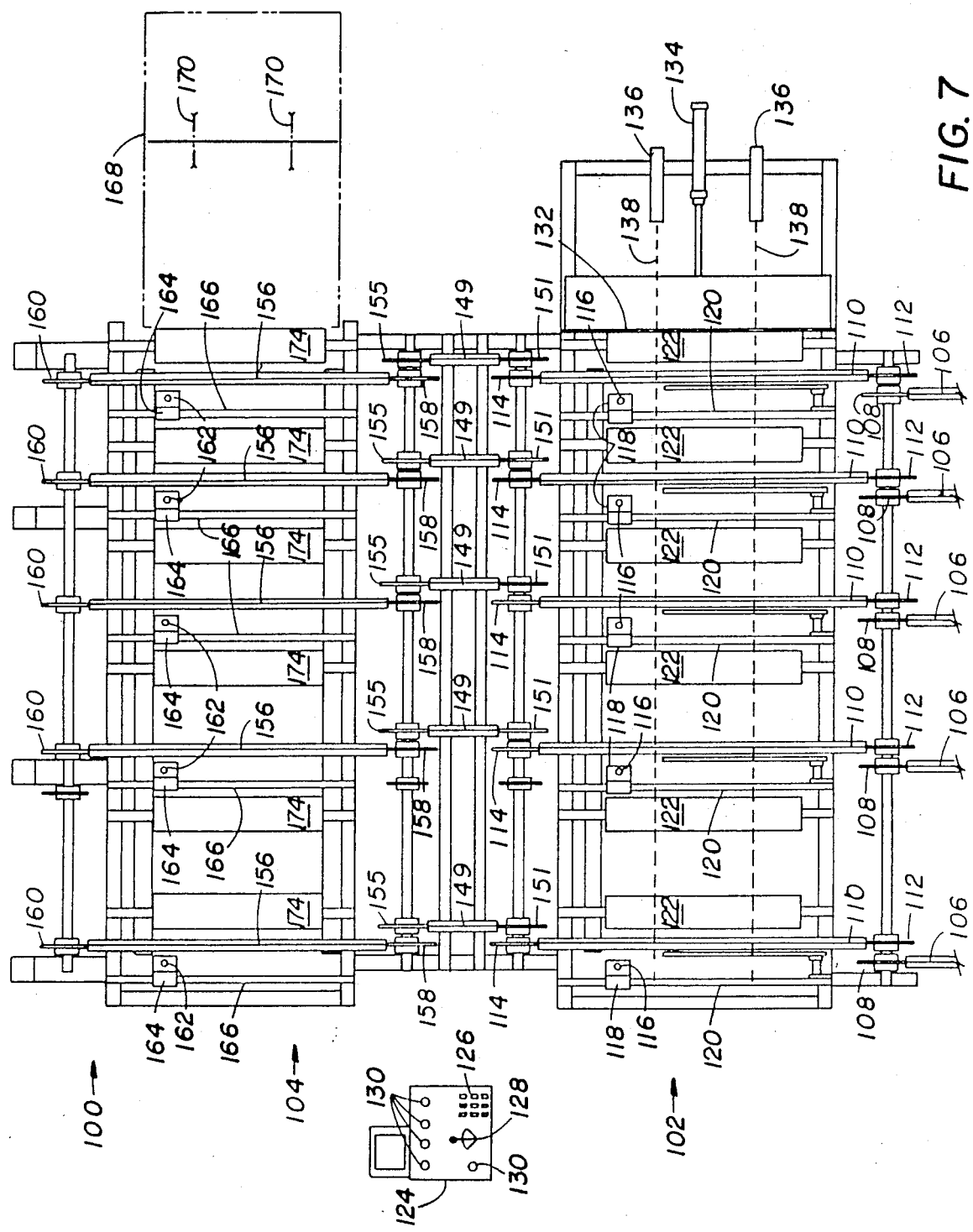
FIG. 7 is a plan view of a second edger having an infeed table and a preview table with edge lasers mounted adjacent the preview table and saws positioned adjacent the infeed table.
Figure 8:
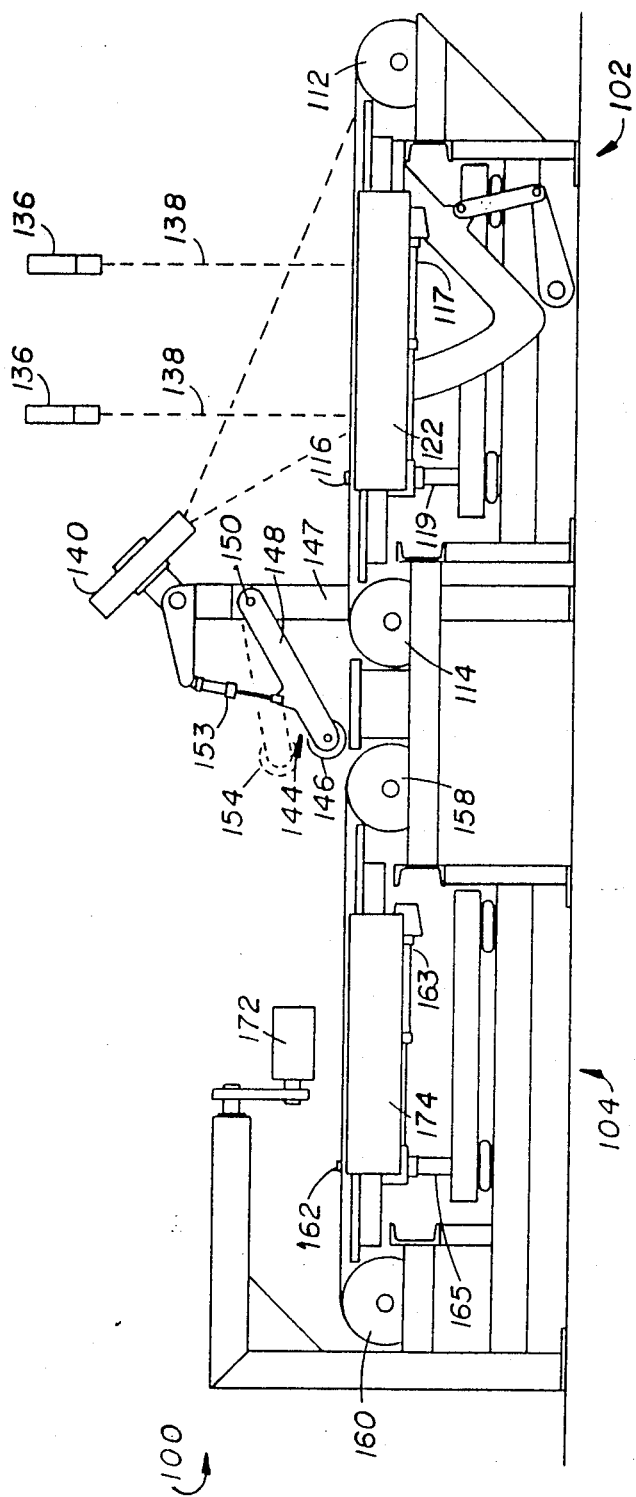
FIG. 8 is an end view of the infeed table and preview table showing trim markers positioned between the two tables.
Figure 9:
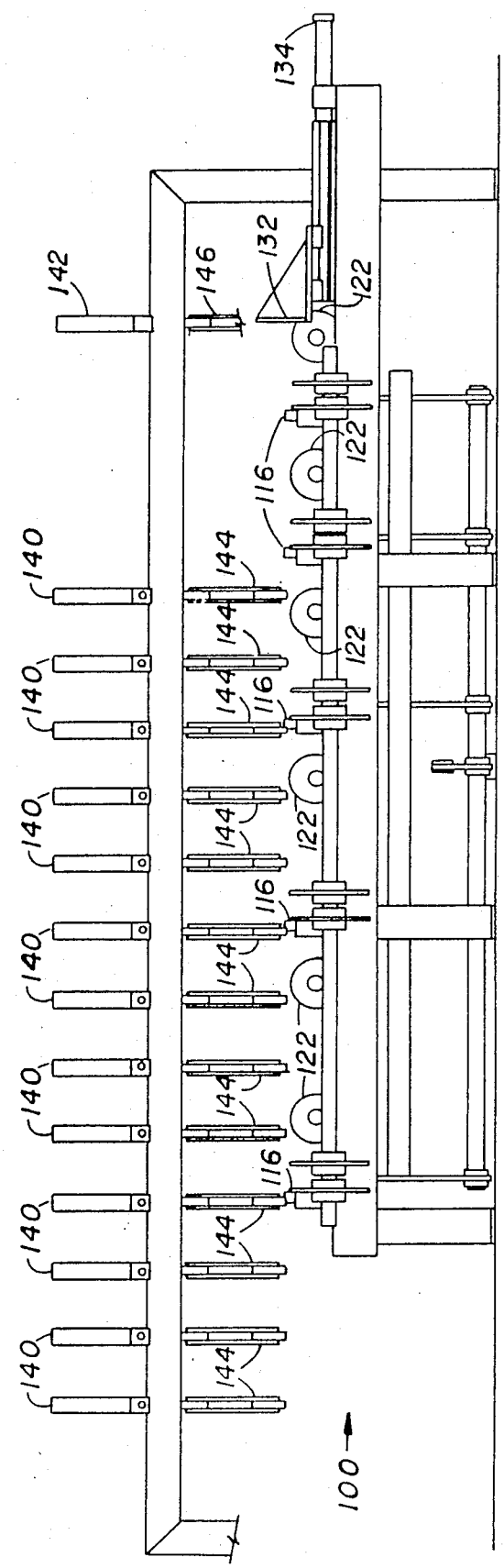
FIG. 9 is a side view of the preview table showing trim markers and lasers aligned with the trim markers.
Figure 10:
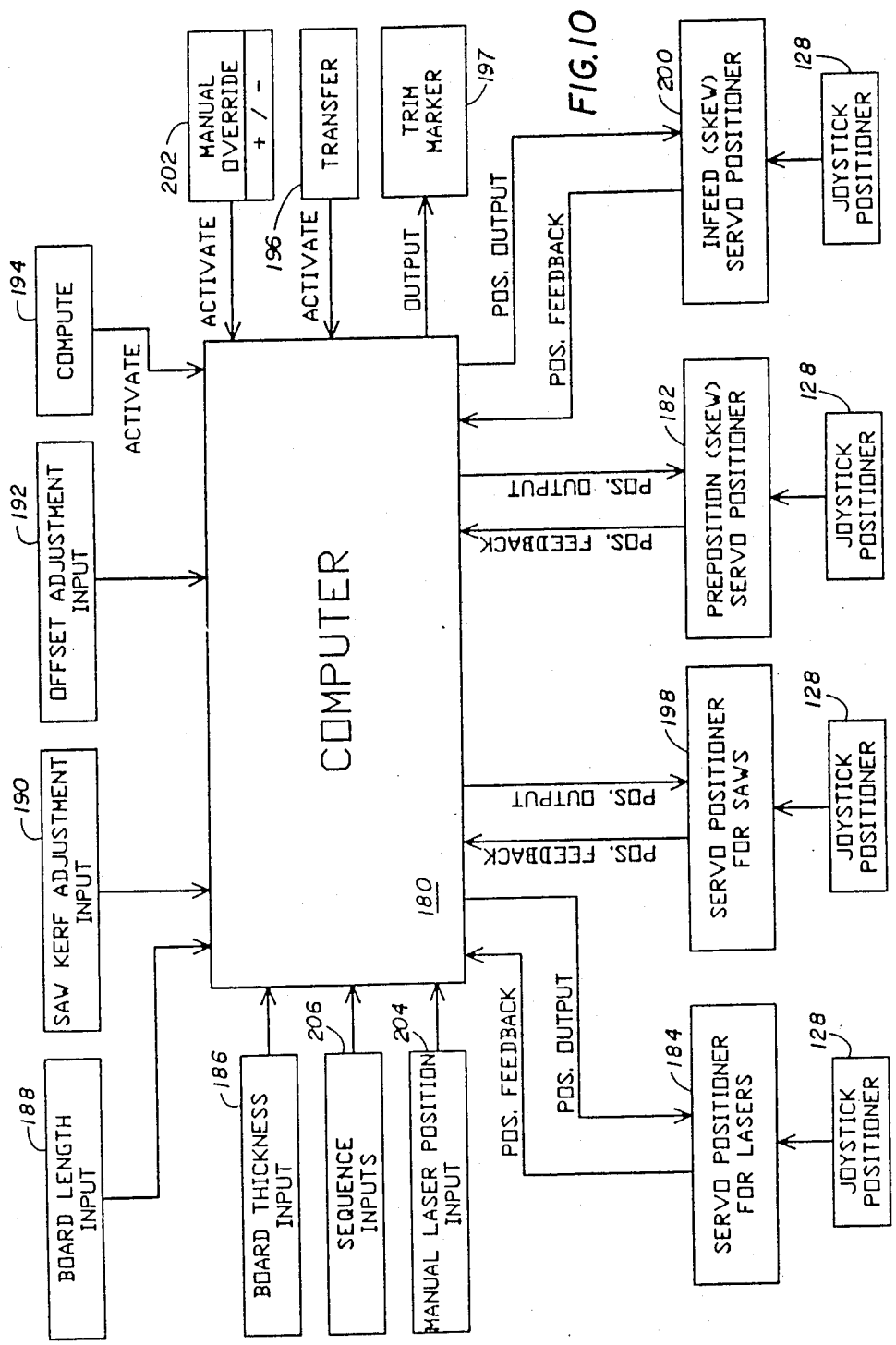
FIG. 10 is an operational diagram for the edger shown in FIGS. 7, 8 and 9.
Figure 11:
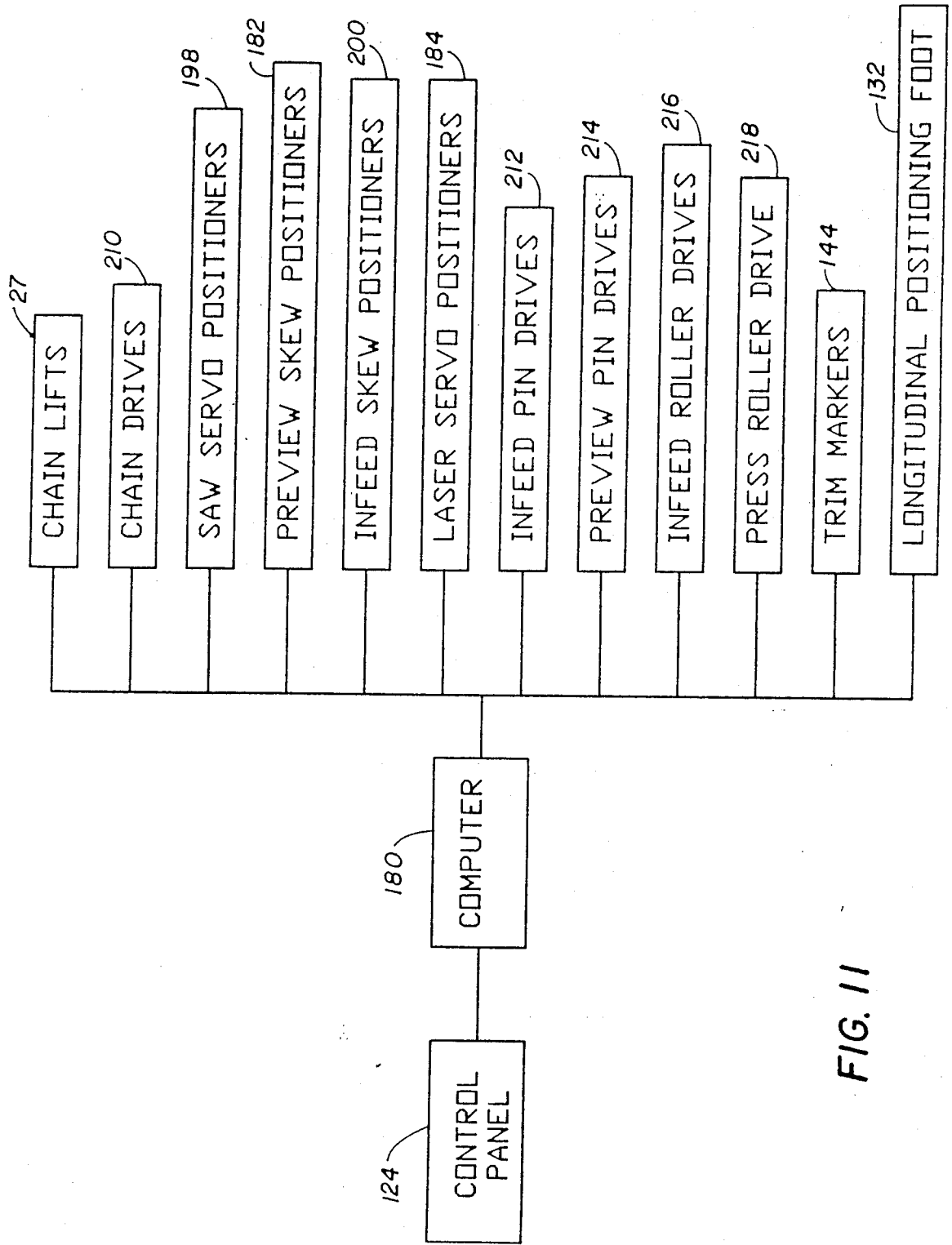
FIG. 11 is a block diagram of the control system for the edger of FIGS. 7, 8 and 9.

An alternate embodiment of the invention is shown in FIGS. 7, 8, 9, 10 and 11 in which FIG. 7 is a plan view; FIG. 8 is an end view; and FIG. 9 is a side view of an edging apparatus 100. FIG. 10 is block diagram illustrating the operation of the apparatus 100 and FIG. 11 is a block diagram illustrating control interconnections. Referring now to FIGS. 7-11, it will be appreciated that the edging apparatus 100 includes a preview table 102 and an infeed table 104 that are positioned in a side-by-side parallel relationship. Boards are delivered to infeed table 104 by chains 106 mounted on sprockets 108 and chains 110 that are mounted on and driven by sprockets 112 and 114. The chains 110 move the boards transversely across the preview table 102 until the boards engage stop pins 116. The stop pins 116 will align at least one edge of the board in a direction generally parallel to the longitude of the preview table 102 and perpendicular to the chains 110. The pins 116 are mounted on brackets 118 which are slidably keyed to support rods 120. The pins 116 and bracket 118 are driven by servo positioners 117 to slide along the rods 120, and air cylinders 119 move the pins 116 up and down. Both movements are controlled by the operator through the control panel 124, and using pins 116 the skew of a board on the preview table 102 may be adjusted.

A longitudinal positioning fence 132 is provided to aid longitudinal positioning of a board. The fence 132 is mounted on a piston and cylinder set 134 so that the maximum extended position of the piston and cylinder set 134 will place the fence 132 in a position defined as the furthermost position for the end of the board. The operator controls movement of the fence 132 through the control panel 124 to place a board in a desired longitudinal position.

A pair of lasers 136, mounted on the preview table 102, form laser lines 138 which represent saw lines. The operator positions the laser lines 138 on the board to select the lines along which the boards will be edged. The lasers 136 are laterally positionable by the operator using the control panel 124 and, preferably, a joy stick 128 is provided for use in moving the lasers 136.

Referring to FIGS. 8 and 9, it will be appreciated that an array of trim lasers 140 and an end trim laser 142 are positioned adjacent infeed table 102. The trim lasers 140 and 142 project lines across the preview table 102 in a direction perpendicular to the longitude of the table 102 and generally parallel to the chains 110 to show the operator standard lengths to which a board may be trimmed. The distances between each of the lasers 140 and the laser 142 are equal to the standard hardwood board lengths. By observing the laser lines projected by the lasers 140 and 142, the operator adjusts the position of the board and chooses a trim length for the board. By reference to FIG. 9, it may be appreciated that the longitudinal adjustment fence 132 may be used to adjust the end position of a board, and a board length is then fed into a computer 180 by the operator through a key pad 126 on the control panel 124. In this manner, the operator selects a trim length and positions the board for being appropriately marked for the trim.

Referring again to FIGS. 8 and 9, it will be noted that trim markers 144 are aligned with the array of trim lasers 140 and 142. As best shown in FIG. 8 the trim markers 144 include marker wheels 146 mounted on the outer end of an arm 148 whose other end is pivotally mounted on a pin 150 and vertical support member 147. A piston and cylinder set 153 is also connected to the arm 148 to lift and lower the arm 148 and marker wheel 146. The piston and cylinder set 153 will normally hold the arm 148 and wheel 146 in the position indicated by the dotted lines 154. However, when an operator selects a particular trim length, the appropriate one of the trim markers 144 will be lowered to the position shown in FIG. 8. Thus, as a board passes between the preview table 102 and the infeed table 104, it is marked for trimming. Since the end trim marker 146 is always used to mark the end of the board, it always assumes the position shown in FIG. 8. Also, as best shown in FIG. 9, it will be noted that the end trim marker 146 is aligned with the longitudinal adjustment fence 132 when the fence 132 is located in its outermost position.

Referring again to FIG. 7, the transfer of the boards from the preview table 102 to the infeed table 104 is described. Once the operator has selected the initial cut position by moving the lasers 136 to desired positions and with the aid of the computer 180 has selected best cut positions, the command is given through a special purpose button 130, to transfer the board from the preview table 102 to the infeed table 104. When this command is received, the pins 116 are moved downwardly by air cylinder 119 to disengage the board and the positions of the lasers 136 are stored in the computer 180 as the best cut positions. The chains 110 are then lifted and driven to transfer the board toward the infeed table 104. Once the board moves off of the preview table 102, it is picked up by chains 149 that are mounted on sprockets 151 and 155. As the board is carried on the chains 149, the trim marks are placed on the board by one of the trim markers 144 and the end trim marker 146 in accordance with the trim length that was previously entered into the computer through the control panel 124. The boards then continue their travel and are transferred onto chains 156 that are driven by and carried on sprockets 158 and 160. The boards continue to travel across the infeed table 104 until they engage the stop pins 162 that are mounted on brackets 164 which in turn are mounted on rods 166. The pins 162, servo positioners 163, brackets 164, air cylinders 165, and rods 166 are structured and driven like pins 116, servo positioners 117, brackets 118, air cylinders 119, and rods 120. The stop pins 162 are moved by the computer 180 to identical positions relative to the infeed table 104 as were the pins 116 relative to the preview table 102. Thus, when the board engages the stop pins 162, it is in a known position on the infeed table 104.

A saw chamber 168 is provided at the end of the infeed table 104, and a pair of edging saws 170 are mounted within the chamber 168 in a conventional fashion. The saws 170 are movable in a transverse direction with respect to the longitude of the infeed table 104 and, thus, may be moved to adjust the edging of the board. Since the board will be in a known position on the infeed table 104, the saws 170 may be placed in the best cut positions that were previously selected by the operator. The operator chose the best cut positions using the lasers 136 and these positions were fed to the computer 180 shown in FIG. 10. When the board is in proper position on the infeed table 104, the computer adjusts the positions of the saws 170 to the best cut positions as previously chosen. After the saws 170 are properly positioned and the board is properly positioned on the infeed table 104, the board is fed into the saw chamber 168.

In accordance with this embodiment, to feed a board, the chains 156 are lowered so that the boards rest on rollers 174 and the presser roller 172 is forced against the upper surface of the board. Next, all of the rollers 174 are rotatably driven to feed the board toward the saws 170, and the chamber 168 may also include feed rollers such as rollers 35 shown in FIG. 2. Just before the feeding process begins, the pins 162 are rotated downwardly by means of the brackets 164 and the rods 166 on which the pins are mounted. In this manner, the pins will not interfere with the movement of the board into the saw chamber 168.

Referring now to FIGS. 10 and 11 in conjunction with FIGS. 7, 8 and 9, the control of the edging apparatus 100 may be described in greater detail. The overall operation of the edging apparatus 100 is controlled through a computer 180. The computer 180 preferably receives its inputs through the control panel 164 or it may receive inputs through physical measuring devices. For example, a mechanical foot can be used to measure the thickness of the board as it passes onto the preview table 102.

The edging process begins when a board is fed onto the preview table 102 in response to commands from the control panel 124. The board will move across the preview table 102 until it engages the stops 116. The stops 116 are mounted on a bracket 118 that is keyed to a rod 120. The bracket 118 will slide longitudinally on the rod 120 and it is positioned thereon by preposition servo positioners 182 (shown as 117 in FIG. 8). Thus, the positions of the pins 116 may be controlled by means of the preposition servo positioners 182 through the control panel 124. Preferably, the joy stick 128 is selectively connected to control the positions of the pins 116. Thus, by manipulating the joy stick positioner 128, each of the pins 116 may be positioned and the skew of a board on the infeed table 102 may be adjusted. The preposition servo positioners 182 are connected to the computer 180 and position information is fed to the computer 180. Thus, the computer 180 constantly monitors the positions of the pins 116.

Next, the joy stick positioner 128 is connected to control servo positioners 184 that are used to move the lasers 136. Each of the lasers 136 is mounted for transverse movement which is controlled by a servo positioner 184. By manipulating the joy stick positioner 128, each of the lasers 136 may be positioned as desired. Again, the servo positioners 184 are connected to the computer to provide position data, and when the lasers 136 are positioned as desired in an initial cut position, this position is recorded in the computer 180.

Next, a board thickness input 186 is provided to the computer 180 by the operator through the control panel 124 using the key pad 126, but such input 186 may alternatively be provided to the computer 180 automatically through a direct measuring device that actually measures the thickness of the board. Likewise, a board length input 188 is entered into the computer 180 by the operator using the key pad 126 on the control panel 124. Also, a saw kerf adjustment input 190 and an offset adjustment 192 are provided to the computer 180. These two adjustment inputs are the same as inputs 80 and 82 described with respect to the first embodiment shown in FIGS. 2-6. A compute command 194 is provided to the computer 180 preferably through a special purpose button 130. When the compute command 194 is given to the computer 180, it will calculate the best cut positions for the saws based on the board thickness input 186, the board length input 188 and the initial cut positions selected by the operator. The initial cut positions will normally be the positions of the lasers 136 when the compute command 194 is given. Upon receiving the compute command 194, the computer will choose a best cut position and will provide a position output to the servo positioners 184 that will place the lasers 136 into the best cut positions and will show the operator the positions that the computer has calculated as the best cut positions. The compute command 194 will also cause the computer 180 to store the final positions of pins 116 which will be used to set the positions of pins 162 on the infeed table 104.

Assuming the operator agrees with the best cut positions chosen by the computer 180, a transfer command 196 is given to the computer 180 through the control panel 124, preferably using a special purpose button 134. When the transfer command is given, the board is transferred from the preview table 102 to the infeed table 104. In response to the transfer command 196, the computer generates a trim marker output 197 that actuates an appropriate one of the trim markers 144 and marker 146 which are forced downwardly onto the board to mark the selected trim location based on the board length input 188. Also, in response to the transfer command 196, the pins 162 are adjusted by the computer 180 into a position corresponding to the former positions of the pins 116. This adjustment is made through infeed servo positioners 200. Thus, when the board stops on the infeed table 104, it will be in a position corresponding to its position on the preview table 102.

Each of the saws 170 has a separate servo positioner 198 so that the saws 170 may be set to any desired position. The computer 180 will place the saws 170 in the best cut positions that were selected on the preview table 102. Since the position of the board on the infeed table 104 is known to exactly correspond to its position on the preview table 102, the saws 170 are positioned so that they cut the board along the best cut positions as shown by the laser lines 138 when the board was on the preview table 102. After the board is properly positioned on the infeed table 104, the press roller 172 engages the upper surface of the board, the rollers 174 are driven and the board is fed into the saws 170 for edging.

A manual override input 202 may also be input into the computer 180 through one of the special purpose buttons 130. If a manual override input 202 is chosen, the operator chooses the edging for the board independently of the computer. In this mode, the joy stick positioner 128 is connected to control the servo positioners 184 for the lasers and select a particular edging for the board. In the manual mode, when the transfer command 196 is given, the saws 170 will be moved to the position selected by the operator using the lasers 136. Also, when the manual override input 202 is given to the computer 180, the joy stick positioner 128 may be connected to the servo positioners 198 for the saws 170. Thus, after the board is positioned on the infeed table 104 and the saws 170 have been moved by the computer 180 to the selected positions, the operator may, if he chooses, again move the saws 170 to another selected position.

Sequence inputs 206 are also fed to the computer 180. These sequence inputs 206 control the sequence of events when one command initiates several actions. For example, the transfer command will cause the pins 116 to move downwardly out of the way, will cause the chains 110 to engage and move the board, will cause the chains 149 to begin moving, will cause one of the trim markers 148 to move downwardly, will cause the chain 156 to begin moving, will cause the pins 162 to rotate upwardly and will cause the chains 156, 149 and 120 to stop moving after they have transferred the board to the desired location. The sequencing of these events is carried on in a conventional fashion through timing that is built into the computer program and/or through mechanical sensors such as limit switches or optical eyes, which may be placed in the edging apparatus 100.

For clarity, the control interconnections are shown in FIG. 11. The control panel 124 is interfaced with a computer 180 which in turn is interfaced with chain lifts 27, chain lift drives 210, saw servo positioners 198, preview skew positioners 182, infeed skew positioners 200, laser servo positioners 184, infeed pin drives 212, preview pin drives 214, infeed roller drives 216, press roller drive 218, trim markers 144 and longitudinal positioning foot 132. The chain lifts 27 shown in FIG. 11 collectively refer to the lift mechanisms used to lift chains 106, 110, 149 and 156. These lifts are essentially the same as lifts 27 shown in FIGS. 2-4. Likewise, the chain drives collectively refer to motors that drive chains 106, 110, 149 and 156. The saw servo positioners 198, preview skew positioners 182, infeed skew positioners 200 and laser servo positioners 184, are piston and cylinder sets having position transducers that are interfaced with the computer 180 for constantly providing the computer 180 with the positions of the mechanisms that are attached to the positioners. The infeed pin drives 212 and the preview pin drives 214 collectively refer to the drive systems for moving the pins 116 and 162 in both the transverse and vertical directions as previously described. The infeed roller drives 216 represent motors that drive the rollers 174, and the press roller drive 218 refers to a piston and cylinder set that drives the press roller 162 downwardly.

Having described the two foregoing embodiments of the present invention, it will be appreciated that the invention provides an edger that is capable of edging boards taking into consideration the rounding rule used in the hardwood lumber industry. That is, the edger of the present invention can take advantage of the rounding rule, can be neutral with respect to the rounding rule, or can edge the boards so that the rounding rule works to the disadvantage of a particular saw mill operator. Also, the present invention provides structure and control that allows the trim decision and the edging decision to be made at the same time and by the same operator. In this manner, the trim decisions and edging decisions may be made more intelligently. The operator may consider the length of the board when making his edging decision or he may consider the edging decision when he makes the trim decision. Although particular embodiments have been described in the foregoing Detailed Description, it will be understood that the invention is capable of numerous rearrangements, modifications and substitutions of parts without departing from the scope of the invention as set forth in the appended claims.

What is claimed is:

1. An edging apparatus controlled by an operator and having saws for edging a board that is priced by the whole board foot in accordance with a rounding rule, comprising:

positioning apparatus for positioning and holding the saws;

selection means controlled by the operator for selecting initial cut positions for the saws;

input means for generating input data including board length and initial cut positions;

compute means responsive to the input data for at least multiplying the length data by a width factor corresponding to the initial cut positions to produce a computed signal;

output means for outputting the computed signal; and means for positioning the saws based on the computed signal.

2. The apparatus of claim 1 wherein said compute means further comprises means for producing a computed signal that corresponds to the product of the length data and width factor rounded in accordance with the rounding rules.

3. The apparatus of claim 1 wherein said output means further comprises display means for displaying information based, at least in part, on the computed signal.

4. The apparatus of claim 3 wherein said means for positioning comprises manual means for positioning the saws by an operator based on the information shown on said display means.

5. The apparatus of claim 1 wherein said input means for generating input data comprises, in part, a computer memory programmed to assume a one inch board thickness.

* * * * *